United States Patent
Chen et al.

(10) Patent No.: US 7,280,987 B2
(45) Date of Patent: Oct. 9, 2007

(54) GENETIC ALGORITHM BASED SELECTION OF NEURAL NETWORK ENSEMBLE FOR PROCESSING WELL LOGGING DATA

(75) Inventors: Dingding Chen, Plano, TX (US); Syed Hamid, Dallas, TX (US); Harry D. Smith, Jr., Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 486 days.

(21) Appl. No.: 10/811,403

(22) Filed: Mar. 26, 2004

(65) Prior Publication Data
US 2005/0246297 A1 Nov. 3, 2005

(51) Int. Cl.
*G06E 1/00* (2006.01)

(52) U.S. Cl. .............................. 706/15; 706/19; 702/6

(58) Field of Classification Search ................. 706/15, 706/19; 702/6
See application file for complete search history.

(56) References Cited

U.S. PATENT DOCUMENTS

| | | | | |
|---|---|---|---|---|
| 5,251,286 A | * | 10/1993 | Wiener et al. | 706/20 |
| 5,444,619 A | * | 8/1995 | Hoskins et al. | 702/13 |
| 5,828,981 A | * | 10/1998 | Callender et al. | 702/6 |
| 5,862,513 A | * | 1/1999 | Mezzatesta et al. | 702/9 |
| 2002/0152030 A1 | * | 10/2002 | Schultz et al. | 702/6 |

OTHER PUBLICATIONS

"Modeling of Sonic Logs in Oil Wells with Neural Network Ensembles", P.M. Granitto, P.F. Verdes, H.D. Navone, H.A. Ceccatto, D. Curia and C. Larriestra, Argentine Symposium on Artificial Intelligence (ASAI'01) (Bs. As., Sep. 12-13, 2001). http://citeseer.ist.psu.edu/granitto01modeling.html.*

"Modular artificial neural network for prediction of petrophysicalproperties from well log data",C. C. Fung, K. W. Wong. H. Eren, R. Charlebois, H. Crocket, IEEE Intstrumentation & Measurement Tech Conf, 1996.*

"Ensemble learning via negative correlation", Y. Liu, X. Yao, Neural Networks, vol. 12 , Issue 10 (Dec. 1999), pp. 1399-1404.*

"A Genetic Algorithm Approach for Creating Neural-Network Ensembles", D. W. Opitz, J. W. Shavlik, Combining Articial Neural Nets, pp. 79-99. Springer-Verlag, London, 1999. http://citeseer.ist.psu.edu/opitz99genetic.html.*

"Evolutionary ensembles with negative correlation learning", Y. Liu, X. Yao, T. Higuchi, IEEE Transactions on Evolutionary Computation, Nov. 2000, vol. 4, No. 4, pp. 380-387.*

(Continued)

*Primary Examiner*—David Vincent
*Assistant Examiner*—Mai T Tran
(74) *Attorney, Agent, or Firm*—Krueger Iselin LLP

(57) ABSTRACT

A system and method for generating a neural network ensemble. Conventional algorithms are used to train a number of neural networks having error diversity, for example by having a different number of hidden nodes in each network. A genetic algorithm having a multi-objective fitness function is used to select one or more ensembles. The fitness function includes a negative error correlation objective to insure diversity among the ensemble members. A genetic algorithm may be used to select weighting factors for the multi-objective function. In one application, a trained model may be used to produce synthetic open hole logs in response to inputs of cased hole log data.

18 Claims, 9 Drawing Sheets

OTHER PUBLICATIONS

"Negative Correlation Learning and the Ambiguity Family of Ensemble Methods", G. Brown, J. Wyatt, Springer-Verlag Berlin Heidelberg 2003.*

Md. Monirul Islam, et al., *A Constructive Algorithm for Training Cooperative Neural Network Ensembles*, Jul. 2003, pp. 820-834, IEEE Transactions on Neural Networks, vol. 14, No. 4.

Gaspar-Cunha, A. *RPSGAe—Reduced Pareto Set Genetic Algorithm: A Multiobjective Genetic Algorithm with Elitism*, Nov. 2002, Six pages, Workshop on Multiple Objective Metaheuristics, Carre des Sciences, Paris, France.

R. M. Everson, et al., *Full Elite-Sets for Multi-objective Optimisation*, 2002, Eight pages, Fifth International Conference on Adaptive Computing in Design and Manufacture (ACDM 2002).

Zhi-Hua Zhou, et al., *Genetic Algorithm based Selective Neural Network Ensemble*, 2001, vol. 2, pp. 797-802, 17th International Joint Conference on Artificial Intelligence, Seattle, WA.

* cited by examiner

|  | Member nodes | Member nodes | Member nodes | Member nodes | Member nodes | Values of MOF | Testing error |
|---|---|---|---|---|---|---|---|
| Ensemble 1 | 5 | 5 | 26 | 26 | 30 | 4.0127 | 0.0239 |
| Ensemble 2 | 5 | 5 | 26 | 26 | 29 | 4.0631 | 0.0221 |
| Ensemble 3 | 5 | 5 | 26 | 30 | 34 | 4.0790 | 0.0241 |
| Ensemble 4 | 5 | 13 | 26 | 26 | 30 | 4.1145 | 0.0249 |
| Ensemble 5 | 5 | 9 | 26 | 26 | 30 | 4.1303 | 0.0236 |
| Ensemble 6 | 5 | 7 | 26 | 26 | 30 | 4.1363 | 0.0255 |
| Ensemble 7 | 5 | 5 | 26 | 28 | 30 | 4.1539 | 0.0248 |
| Ensemble 8 | 5 | 5 | 26 | 26 | 32 | 4.1702 | 0.0228 |
| Ensemble 9 | 5 | 5 | 14 | 26 | 26 | 4.1726 | 0.0223 |
| Ensemble 10 | 5 | 26 | 29 | 30 | 34 | 4.2068 | 0.0245 |

Fig. 7

|  | K1=1<br>K2=0<br>K3=0 | K1=0<br>K2=1<br>K3=0 | K1=0<br>K2=0<br>K3=1 | K1=0.3333<br>K2=0.3333<br>K3=0.3333 | K1=0.3<br>K2=0.1<br>K3=0.6 | K1=0.2193<br>K2=0.4336<br>K3=0.3471 |
|---|---|---|---|---|---|---|
| Ensemble 1 | 0.0251 | 0.0262 | 0.0237 | 0.0255 | 0.0239 | 0.0227 |
| Ensemble 2 | 0.0262 | 0.0255 | 0.0221 | 0.0253 | 0.0221 | 0.0227 |
| Ensemble 3 | 0.0252 | 0.0278 | 0.0224 | 0.0234 | 0.0241 | 0.0226 |
| Ensemble 4 | 0.0257 | 0.0277 | 0.0260 | 0.0257 | 0.0249 | 0.0219 |
| Ensemble 5 | 0.0253 | 0.0265 | 0.0223 | 0.0254 | 0.0236 | 0.0234 |
| Ensemble 6 | 0.0237 | 0.0261 | 0.0245 | 0.0262 | 0.0255 | 0.0245 |
| Ensemble 7 | 0.0232 | 0.0283 | 0.0251 | 0.0276 | 0.0248 | 0.0221 |
| Ensemble 8 | 0.0278 | 0.0252 | 0.0256 | 0.0259 | 0.0228 | 0.0239 |
| Ensemble 9 | 0.0247 | 0.0271 | 0.0231 | 0.0241 | 0.0223 | 0.0227 |
| Ensemble 10 | 0.0256 | 0.0259 | 0.0243 | 0.0232 | 0.0245 | 0.0231 |

Fig. 11

GENETIC ALGORITHM BASED SELECTION OF NEURAL NETWORK ENSEMBLE FOR PROCESSING WELL LOGGING DATA

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention relates to neural networks trained to predict one or more parameters in response to a plurality of inputs, and more particularly to systems and methods for using multi-objective genetic algorithms and negative correlation to select neural network ensembles for processing geophysical data.

BACKGROUND OF THE INVENTION

In the oil and gas industry today, there are several conditions that drive the need for non-traditional methods for obtaining open hole logging data. As a result, oil and gas companies are more inclined to explore such non-traditional methods for obtaining open hole logging data to help in their decision-making processes. The use of cased hole logging data, in particular pulsed neutron data, to generate pseudo or artificial open hole triple combo log information is one approach which has been found to be useful.

One of the conditions is simple economics. Every operation carried out in a borehole takes time, which translates directly to increased cost of drilling the well. Therefore, if a logging operation in the well, e.g. an open hole log, can be avoided, it reduces the cost of drilling the well. If the same data can be obtained from another operation which will normally be performed in any case, e.g. a cased hole pulsed neutron log, then the actual open hole log can be skipped, saving time and money.

Adverse drilling conditions often make open hole logging expensive, risky or essentially impossible. Such conditions include extreme wash outs, shale bridges, caving, etc. These conditions may make it physically impossible to run an open hole logging tool in the hole. If the tool can be run, the conditions may prevent collection of useful data in at least portions of the well.

Modern drilling techniques may make open hole logging risky or impossible. For example, highly deviated wells may have high rates of turn or high angles which make it difficult or impossible to run an open hole tool. Some companies use slim holes, e.g. 3.5 inch diameter wells, which are too small for available open hole logging tools. However, pulsed neutron logging tools are available for running in such wells after they are cased.

Most geologists and engineers are familiar with data produced by open hole logs, e.g. the resistivity and porosity curves. They are accustomed to using such data to calculate saturation. However, they are not familiar with the curves produced by pulsed neutron logs. As a result of these conditions, efforts have been made to produce synthetic or artificial open hole type logs from real data taken by pulsed neutron logging tools. However, various difficulties have been encountered in developing the predictive tools or models which are used to create such synthetic logs. For this approach to be successful, the models must produce accurate synthetic logs which can be relied on.

Various predictive tools have been used in processing geological logging data for many years. A field data based predictive model usually takes selected measurements of specific logging tools as inputs and produces predicted outputs using either a deterministic function or an empirical function generated from a training process. As a typical predictive framework, the artificial neural network (ANN) has been used in petrophysical applications. Actual pulsed neutron data and open hole data from a selected well may be used to build an ANN model using optimization algorithms. The trained ANN may then be tested with data from other parts of the same well or from different wells for validation.

Systems using a single neural network trained in this way are capable of providing good synthetic or artificial triple combo open hole logs from real data taken by pulsed neutron logging tools, at least for wells near, or in the same geological area as, the well or wells used for training. However, neural network ensembles have been found better suited for large and complex cases and are capable of better generalization performance. A neural network ensemble is a set or group of several individual neural networks, each of which have been trained to operate on the same set of input parameters and produce a predicted or synthetic output of one or more other parameters. For the well logging example discussed herein, each neural network is trained to operate on seven input parameters from a pulsed neutron logging tool and generate three synthetic output parameters corresponding to the outputs of a triple combo open hole logging tool. The outputs of the ensemble members are combined, e.g. averaged, to produce a more accurate synthetic output or prediction.

A properly selected ensemble of trained neural networks has been shown to have a better generalization performance than a typical single network. However, since the conventional selection of a neural network ensemble includes manually determining the number of networks in the ensemble, the structure of the individual networks, and the weighting coefficients of the individual networks, it often involves a tedious trial and error process which may be difficult for inexperienced users.

Some automated processes for selecting neural network ensembles are known, for example genetic algorithms. However, such processes require selection of an objective function for the network selection. A typical objective function would be the generalization error of each network, that is the error measured over all possible inputs. Since all possible inputs are not available, it is not possible to know the actual generalization error. The normal practice is to minimize the validation error based on the available data. A problem arises if the validation data set is not a good representation of the unknown new data due to its limited availability or diversity. This problem may occur when the validation data is selected from only one well and the neural network ensemble is expected to interpret data from other wells, which is normally the intended use of the ensemble.

One reason neural network ensembles provide better results than a single neural network is diversity or negative correlation of errors generated by the neural networks forming an ensemble. Diversity has been achieved by various techniques, e.g. using networks with different topologies or different starting coefficients, or using different data to train the networks. More recently a technique known as negative correlation learning has been used in the network training process to increase diversity among networks. However, the known algorithm is a stochastic approach, i.e. the network coefficients and architectures are updated pattern by pattern. It cannot be used in batch mode training in conventional neural network software environments.

SUMMARY OF THE INVENTION

The present invention provides a method and system for generating a neural network ensemble having improved generalization performance. Conventional training algorithms are used to generate a set of individual neural networks having error diversity based on conventional methods, e.g. each neural network may have a different number of hidden neurons. A genetic algorithm is then used to select an optimum ensemble, i.e. subset, from the set of neural networks based on a multi-objective fitness function which includes a negative correlation objective.

In one embodiment, a genetic algorithm is used to select weighting coefficients for the multi-objective function.

BRIEF DESCRIPTION OF THE DRAWINGS

FIG. 7 is a chart identifying the top ten ensembles, the value of their multi-objective function and their testing errors.

FIG. 11 is a chart listing testing errors for various groups of ensembles selected based on various sets of weighting constants, including a set selected by the process of FIGS. 9 and 10.

DETAILED DESCRIPTION OF THE INVENTION

Figure 1:
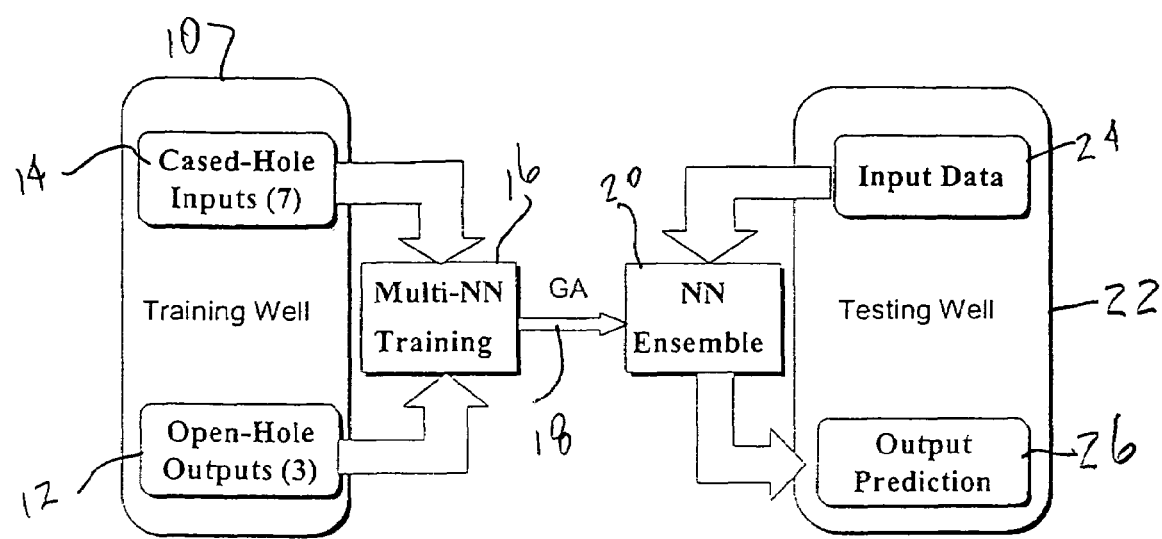
FIG. 1 is a flow chart illustrating the overall operation of an embodiment of the present invention.

FIG. 1 illustrates the overall structure of an embodiment of the present invention useful in generating synthetic open hole logs from cased hole pulsed neutron logs as discussed above. Block 10 represents data collected from an actual well which is selected for use in training neural networks. The data includes open hole data 12 which may include the following three parameters, formation density, neutron porosity, and deep resistivity. The data also includes cased hole data 14 from a pulsed neutron log run after casing the well. The cased hole data 14 may include the following seven parameters: GR (gamma ray), SGIN (sigma formation intrinsic), RIN (inelastic gamma count rate ratio between detectors), RTMD (capture gamma count rate ratio between detectors), NTMD (near detector overall capture gamma count rate), FTMD (far detector overall capture gamma count rate) and SGBN (sigma borehole in near detector).

At block 16, the data sets 12 and 14 are used to train a set of neural networks. That is, a plurality of neural networks are generated by inputting the data 14 and adjusting network coefficients until the network outputs are close approximations to the actual open hole data 12 from the same well. At 18, a genetic algorithm is used to select a subset of neural networks to form a neural network ensemble 20.

Once the ensemble 20 has been selected, it is used to process data from a testing well 22. Input data 24 from the testing well 22 may be the seven outputs of a pulsed neutron logging tool which has been operated in the testing well after it was cased. In response to the data 24, the NN ensemble 20 produces an output 26 which is a prediction or estimate of the normal three open hole log signals. The testing well 22 may be a true testing well in which open hole logs were actually run so that the predicted signals 26 can be compared to the actual data for testing purposes, i.e. to show that the ensemble 20 is accurate. Alternatively, the testing well 22 may be a true application well in which open hole logs were not run and the output prediction 26 may then used as the open hole data which would have been obtained had an open hole log actually been run.

Figure 2:
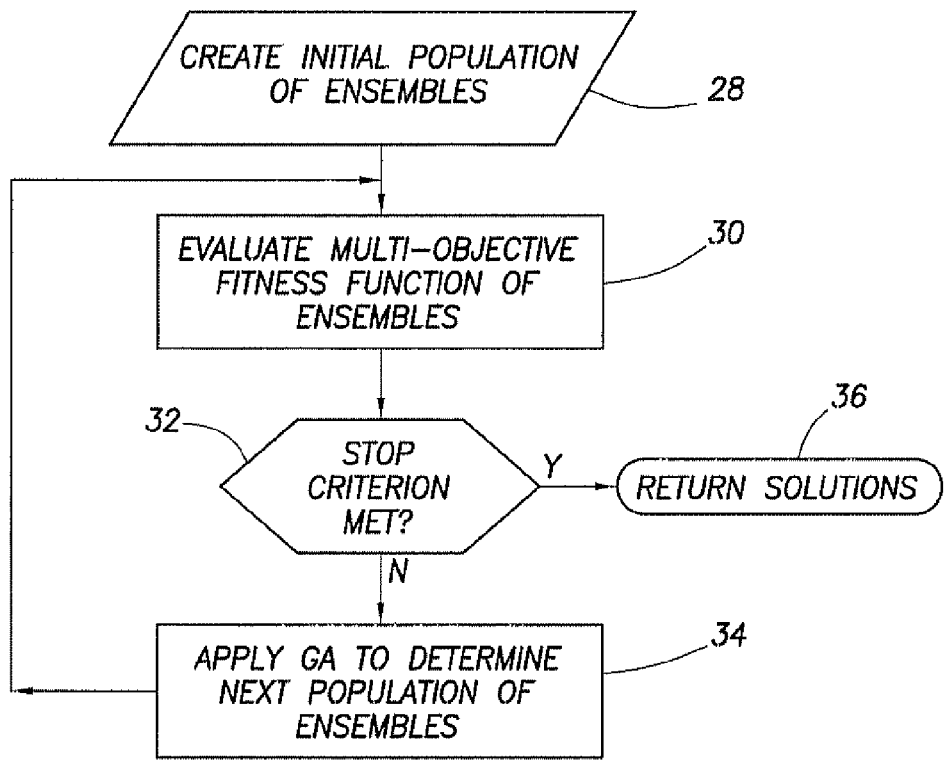
FIG. 2 is a flow chart illustrating use of a genetic algorithm to select a neural network ensemble.

FIG. 2 illustrates the use of a genetic algorithm to select a neural network ensemble as indicated at step 18 in FIG. 1. At step 28, an initial set of ensembles, which may be randomly selected, is created. At step 30, each of the ensembles from step 28 is evaluated by a multi-objective fitness function to determine how closely it performs the desired function. At step 32 the results of step 30 are compared to a stop criterion. If the criterion is not met, then at step 34 the conventional genetic algorithm processes of selection, crossover and mutation are performed to generate a new set of ensembles. The new set is returned to step 30 and evaluated again. The process is continued until at step 32 the stop criterion is met. The last set of ensembles is then output at step 36, preferably in an order ranked according to the multi-objective fitness function evaluation. As shown below, the solutions at step 36 may be the best five to ten ensembles, along with rankings.

Figure 4:
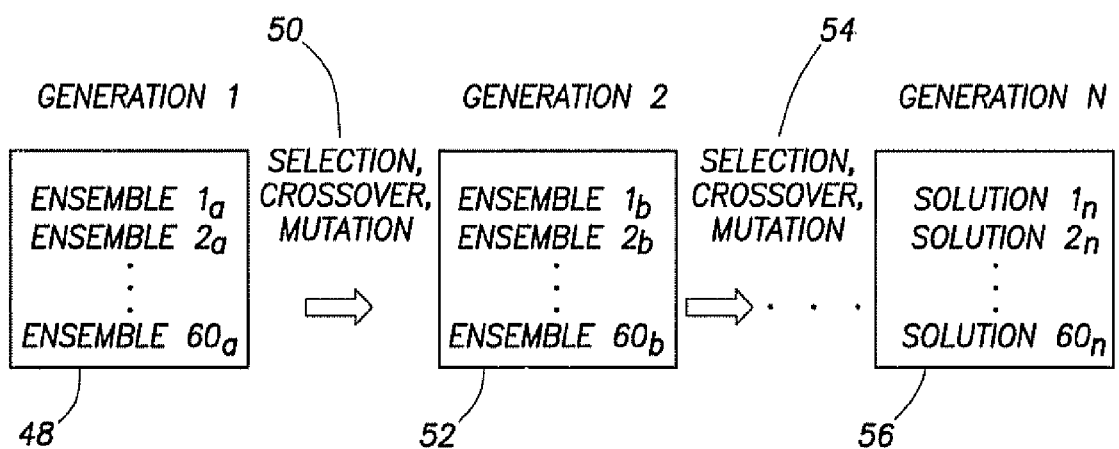
FIGS. 3 and 4 are flow charts illustrating more details of the use of a genetic algorithm to select a neural network ensemble.
Figure 3:
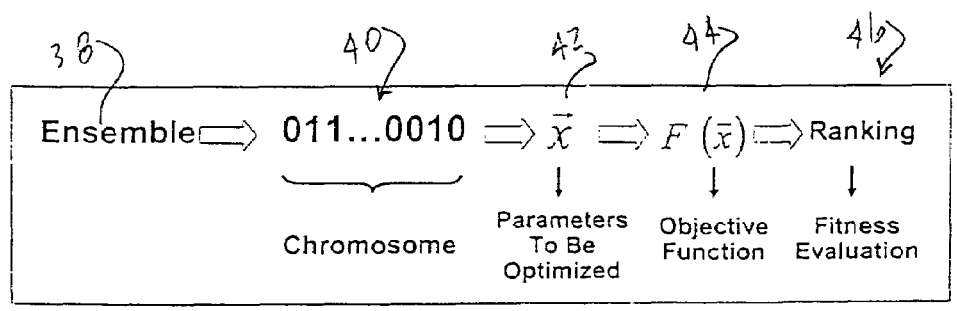

FIGS. 3 and 4 provide more details of the mechanics of the genetic algorithm process of FIG. 2. In FIG. 3, an ensemble may be represented by, or identified by, a digital word 40. In one embodiment disclosed herein, the initial set of neural networks 16 (FIG. 1) contains thirty-two trained networks and each ensemble contains five of the networks. Each network may therefore be identified by a five bit digital word and each ensemble may be identified by a twenty-five bit word which is the combination of five five-bit words. In the conventional terminology of genetic algorithms, the twenty-five bit word representing a given ensemble is called a chromosome. A plurality of parameters 42 are selected and an objective function 44 of those parameters is used at 46 to rank the ensemble represented by the chromosome to provide a ranking of the ensemble based on its multi-objective fitness evaluation.

While the example described herein included thirty-two individually trained neural networks, other numbers of networks could be trained. For example, sixteen networks could be trained. Each of the sixteen could be identified by a four bit word and for five network ensembles, each ensemble could be identified by a twenty bit chromosome. Thirty-two individual networks may be considered a maximum number and sixteen may be a preferred number of networks.

In FIG. 4 a first generation 48 of ensembles contains sixty ensembles, each comprising five of the thirty-two trained neural networks 16 (FIG. 1). After the evaluation process 30 of FIG. 2, at step 50 the conventional genetic algorithm processes of selection, crossover and mutation are performed to produce a second generation 52 of sixty ensembles. The second set is evaluated and ranked and the selection, crossover and mutation processes are repeated until a final generation N, 56 of ensembles is produced. The final generation 56 may be listed by fitness function so that one ensemble may be selected for use in processing data from new wells as discussed above. If additional test wells are available, it may be desirable to test the top ranked five to ten ensembles and make a final selection based on the results.

Ensembles provide improved results when there is diversity among the individual neural networks making up the ensemble. There are several ways in which the networks 16 of FIG. 1 may have diversity. One way is to train each network with data from a separate well. In the present embodiment, this could require having up to thirty-two wells in which both open hole logs and cased hole logs were run. This is generally impractical and in conflict with the goal of reducing the number of open hole logging operations. Another approach to diversity is providing networks with different structures. This can be done by starting neural network training with different coefficients or by having different numbers of neurons, or hidden nodes, in each network. In this embodiment, network diversity was achieved by using thirty-two networks having different numbers of hidden nodes ranging from five to thirty-six nodes. In the drawings, the individual networks are identified by the number of hidden nodes.

As indicated in FIG. 3, the fitness of an ensemble is evaluated by an objective function based on a plurality of parameters or objectives. In this embodiment, a suitable multi-objective function is identified by equation (1):

$$f = k_1 \times EMSE + k_2 \times \overline{SSW} + k_3 \times \overline{P} \quad (1)$$

where EMSE is the ensemble mean-squared-error, $\overline{SSW}$ is the ensemble sum-squared-weights, $\overline{P}$ is the ensemble negative correlation measure, and $k_1$, $k_2$ and $k_3$ are normalized coefficients with summation $k_1+k_2+k_3=1$. Minimizing this function on the validation data can improve the robustness of ensemble estimators on new data.

EMSE, or ensemble validation error, measures prediction error of a ensemble estimator on the validation data. In this implementation, the ensemble estimator is a arithmetic mean averaged over the member network outputs. It is often the case for logging applications that validation data are testing data withheld from the training well or wells, where actual measurements are available to be used as true values to calculate mean-squared prediction error.

$\overline{SSW}$, or ensemble complexity, measures ensemble complexity via averaging $\overline{SSW}$ values of member networks. For each individual network, $\overline{SSW}$ is a sum of squared connecting coefficients of internal neurons over multiple layers, and can be calculated by calling a standard function in a NN toolbox. Initially, $\overline{SSW}$ has been chosen as a complexity penalty term associated with regularization techniques in NN training. Although it is still controversial about whether or not large $\overline{SSW}$ due to overtraining should be avoided in selecting member networks for ensemble, experiments showed that complexity control is indeed helpful when validation data are sparse and/or from a single well.

$\overline{P}$, or ensemble negative correlation, is a measure of ensemble negative correlation. A new batch-mode-based ensemble selection operator to evaluate negative correlation among the member networks can be defined as follows.

For each data point, the sum of deviations around a mean is zero, i.e., $$\sum_{i=1}^{M} (F_i(n) - \overline{F}(n)) = 0 \quad (2)$$

where $F_i(n)$ and $\overline{F}(n)$ are the output of the ith individual NN and the output of the ensemble respectively on the nth sample.

For a particular network, the measurement $$P_i(n) = (F_i(n) - \overline{F}(n)) \sum_{j \neq 1} (F_j(n) - \overline{F}(n)) \quad (3)$$

will have a negative value, and can be used to evaluate its sample negative correlation with the rest of networks.

For batch mode, both $F_i$ and $\overline{F}$ may be defined to be r by c matrices, where r is the number of output variables in NN model, and c is the number of the validation samples. The negative correlation measure of ith NN averaged over the whole validation data set can be expressed as:

$$\overline{P}_i = \frac{1}{c \times r} \sum_{r} \sum_{c} \left[ (F_i - \overline{F}) * \sum_{j \neq 1} (F_j - \overline{F}) \right] \quad (4)$$

In the expression above, '*' denotes multiplication element by element.

The ensemble negative correlation is a arithmetic mean of correlation measurements of member networks.

$$\overline{P} = \frac{1}{M} \sum_{i=1}^{M} \overline{P}_i \quad (5)$$

The weighting coefficients $k_1$, $k_2$ and $k_3$ add weighting factors to the multi-objective function. These coefficients are pre-set before the multi-objective function is applied. In other words, the only evolved parameters are individual networks. The selection of weighting coefficients will be dependent on the nature of the validation data, the configuration of the individual networks, and the algorithm used for training NNs. A genetic algorithm based inverse method to help selection of the weighting coefficients is discussed below.

In preferred embodiments, the individual neural networks may be trained with Levenberg-Marquardt, Bayesian regularization, conjugate gradient or other optimization algorithms using batch mode. The desirable diversity and negative correlation among the individual neural networks may be created by using different architectures, initial weights, stopping criteria and/or training sets. In the specific embodiment discussed below, each neural network had a different number of hidden nodes. An ensemble may comprise any reasonable number of individual neural networks. In the specific embodiment discussed below, each ensemble comprises five neural networks. When the total number of neural networks is thirty-two, each network can be represented by a five-bit binary number and a twenty-five bit long code string or chromosome can represent an ensemble.

Since the multiple objectives, EMSE, $\overline{SSW}$, and $\overline{P}$, in the fitness function may have different scales in amplitude, it is preferred to normalize the values of the objectives before computing the weighted sums. This may be done by randomly selecting a large number of ensembles from the trained individual neural networks and calculating the minimum and maximum values for each objective for each ensemble. The calculated minimums and maximums can then be used to scale the objective values during genetic algorithm processing to a range of minus one to plus one.

Determining the weighting factors, $k_1$, $k_2$, and $k_3$, is not difficult when the objective values have been normalized. A larger weight may be given to the validation error if the validation data set is large, is from multiple wells or is otherwise a good representation of the data to be processed later. A larger weight may be given to the negative correlation objective if the validation data set is small or is from a single well. A larger weight for the negative correlation objective may improve the robustness of the ensemble prediction in general. The effect of $\overline{SSW}$ on ensemble performance may be small compared to the validation error and negative correlation value. However, if the individual neural networks are trained without using early stopping and regularization techniques, simulation experiments indicate that a larger weight for $\overline{SSW}$ should be used to penalize increased parameter magnitude. Other factors may be considered in selecting the values of the weighting factors.

In the specific embodiment discussed below, an ordinary genetic algorithm was modified for this application. The initial population consisted of fifty ensembles. In each generation, ten randomly generated new ensembles were combined with the updated population, and an additional ranking was performed to remove the least fit ten ensembles to keep the population at fifty. The genetic algorithm operators were only applied to the resulting fifty ensembles to create the next generation. Single point crossover was used to exchange binary codes between two representative strings. Mutation was used generally as a background operator which may inhibit the possibility of converging to a local optimum. The setting parameters used in the genetic algorithm were: population size—fifty; crossover probability—0.7; mutation probability per string—0.7; number of elite solutions—ten; and, stopping condition—fifty generations.

In a specific example, the methods described above were tested with an example of open-hole triple combo prediction using cased hole pulsed neutron inputs. Each individual neural network had seven inputs, one hidden layer, and three outputs. Thirty-two networks having different numbers of hidden nodes ranging from five to thirty-six were trained using a Levenberg-Marquardt algorithm. Training data had been collected from over 4500 feet of a single well. The data was split into training, validation and testing sets at a ratio of 80%, 10% and 10% respectively for each fifty-foot interval of the well. The training data may be split in other ratios if desired.

Figure 5:
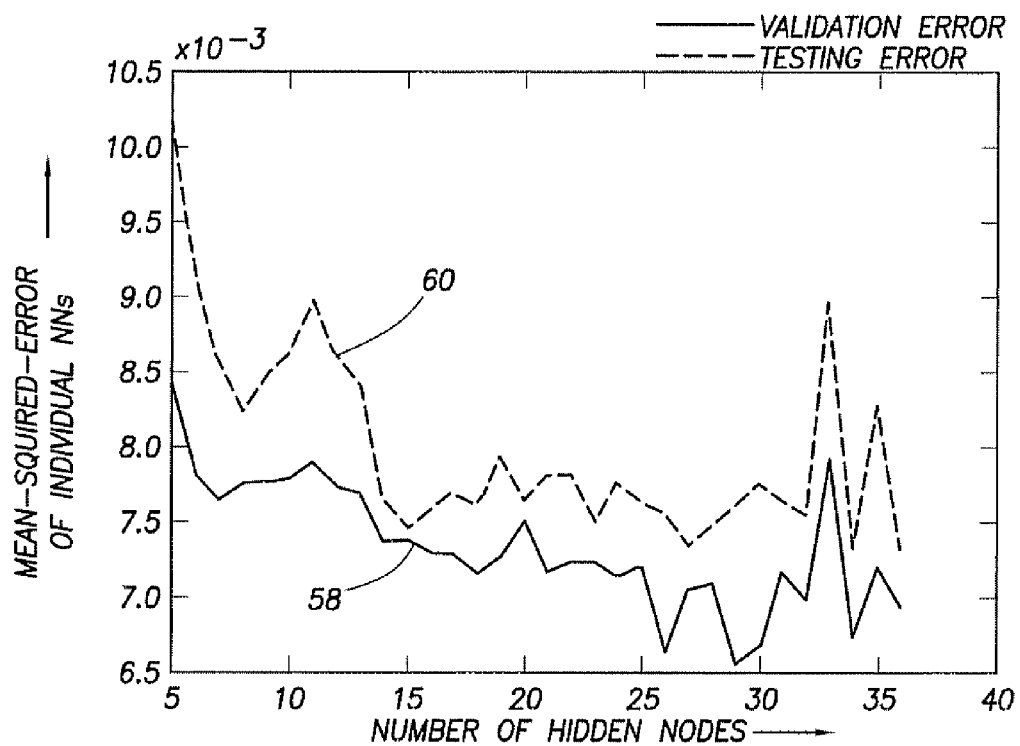
FIG. 5 is a plot of mean squared error of individual neural networks based on validation data and testing data from the training well data set.
Figure 6:
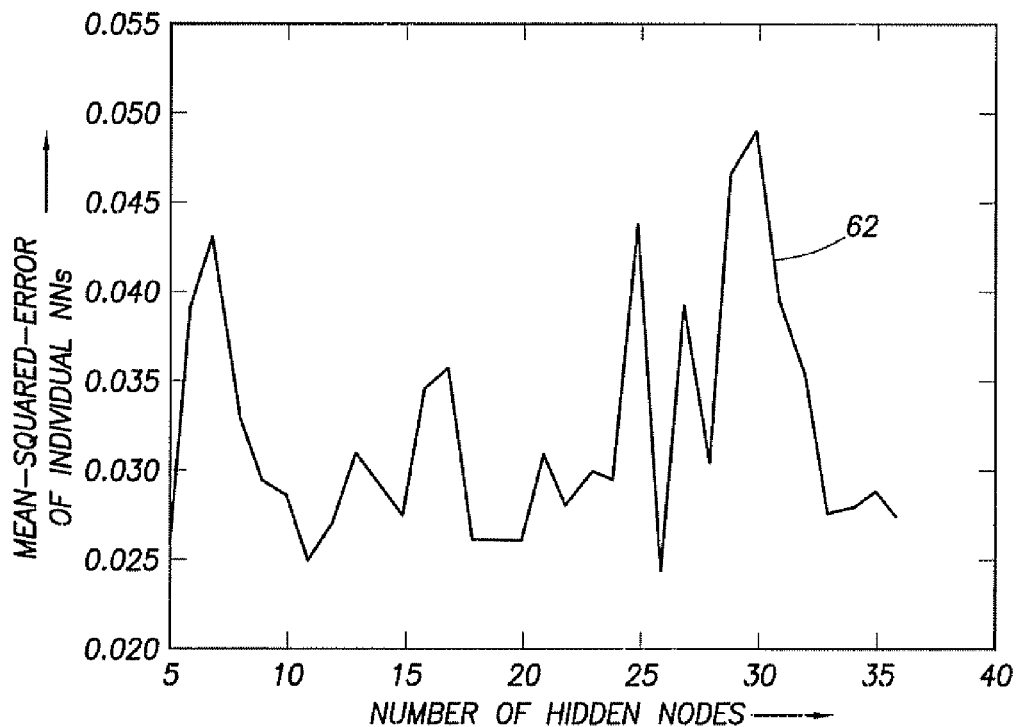
FIG. 6 is a plot of mean squared error of individual neural networks based on testing data from a different testing well.

FIG. 5 illustrates the validation error 58 and the testing error 60 for the thirty two trained neural networks. Each network is identified by the number of hidden nodes. These error values are the average of the errors of the three triple combo outputs using the validation and testing data from the training well. FIG. 6 illustrates the prediction error 62 of the same neural networks using data from a different testing well.

FIGS. 5 and 6 illustrate that some neural networks have small testing errors on the training well, but large errors on the testing well, e.g. networks with 29 and 30 hidden nodes. Others have large testing errors on the training well, but small errors on the testing well, e.g. networks with 5 and 11 hidden nodes. This makes selection of a single neural network difficult if only data from a single well is available at an early decision making stage.

The performance of randomly generated five member ensembles were evaluated for the same data. Two thousand ensembles were randomly selected from the thirty-two neural networks. The ensemble prediction errors ranged from a low of 0.020 to a high of 0.0375. There were 579 ensembles with a prediction error below 0.025, which is the best individual network prediction error shown in FIG. 6. This evaluation illustrates that ensembles are capable of providing improved results as compared to individual networks. However, only about thirty percent of the ensembles were at least as good as the best single network. The present invention provides a straightforward process for selecting ensembles which may have results better than can be achieved with individual networks.

The multi-objective genetic algorithm process discussed above and shown in FIGS. 2, 3 and 4 was applied to five member ensembles of the thirty-two trained neural networks. The weighting factors were $k_1$=0.3, $k_2$=0.1, and $k_3$=0.6. FIG. 7 is a table listing the ten multi-objective genetic algorithm selected ensembles having the best multi-objective fitness function, MOF, values. FIG. 7 also lists the testing, or prediction, errors for these same ensembles. The MOF values were calculated using ten percent of the data from a training well. The testing error, EMSE, values were calculated using the whole data set from a testing well. Most of these ensembles have prediction errors which are superior to the best single neural network prediction error shown in FIG. 6. None are significantly worse. This makes user selection of an optimum ensemble easier. The ensemble performance can be expected to have better generalization performance than an individual network.

FIG. 7 also illustrates several unexpected or counter intuitive characteristics of this ensemble selection method. Individual neural networks with 29 and 30 hidden nodes exhibited large errors in FIG. 6. However, one or both of these networks form part of eight of the top ten ensembles. The negative correlation of errors allows these networks to contribute to overall error reduction. In nine of the ensembles, networks with 5 and/or 26 hidden nodes appear twice. These characteristics of the selected ensembles demonstrate the strength of the present invention.

Figure 8:
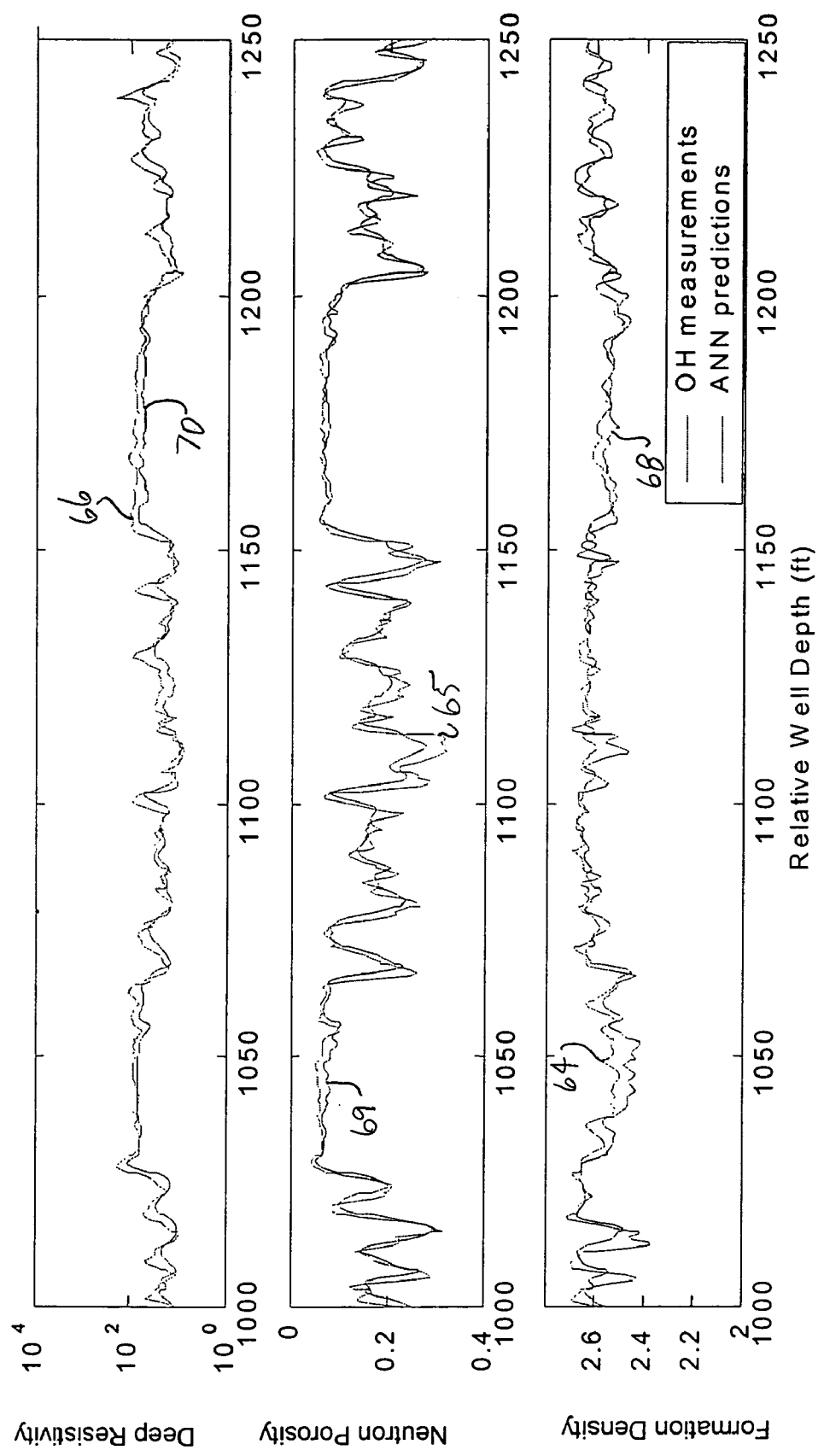
FIG. 8 is a plot of three actual open hole triple combo log parameters and the synthetic or predicted values of the same parameters generated by inputting seven cased pulsed neutron log parameters from the same well to a neural network ensemble produced according to the present invention.

FIG. 8 provides a comparison of actual triple combo logs of formation density 64, neutron porosity 65 and deep resistivity 66 to synthetic predictions 68, 69, 70 of the same log parameters. The synthetic versions were generated by inputting seven parameters from a cased hole pulsed neutron logging tool into a neural network ensemble created by the methods described above. The close correlation of the synthetic open hole logs to actual open hole logs indicates that ensembles produced by use of the present invention can accurately produce predictions of the open hole logging parameters.

The above-described process can be more generally described as comprising the following steps.

1. Use node growing method to generate a number of individual neural networks.

2. Specify or select the number of neural networks in an ensemble.
3. Define a binary code representation of the member neural networks for use as the chromosome in a genetic algorithm.
4. Determine the maximum and minimum values to be used to normalize the three parameters, EMSE, $\overline{SSW}$ and $\overline{P}$, of the multi-objective function from a large number of randomly selected ensembles.
5. Assign values for the weighting functions, $k_1$, $k_2$, and $k_3$, based on factors such as the quality of available data and the anticipated complexity of the system being modeled.
6. Initialize a population of neural network ensembles, calculate the fitness functions and rank the ensembles.
7. Iteratively update the generations of candidate ensembles by combining genetic algorithm selected outputs through crossover, mutation and elitism until a stopping threshold is met. It has been found desirable to include in each generation some new randomly selected ensembles.
8. Review the resulting multiple ensembles and select the one best suited for the application.
9. Test the prediction error of the selected ensemble(s) with new data if possible.

Normally, steps 1-8 are performed using data from one or more training wells and step 9 is performed using data from a separate testing well. Prediction error based on a new testing well may be measured in terms of conventional mean squared error only.

Figure 9:
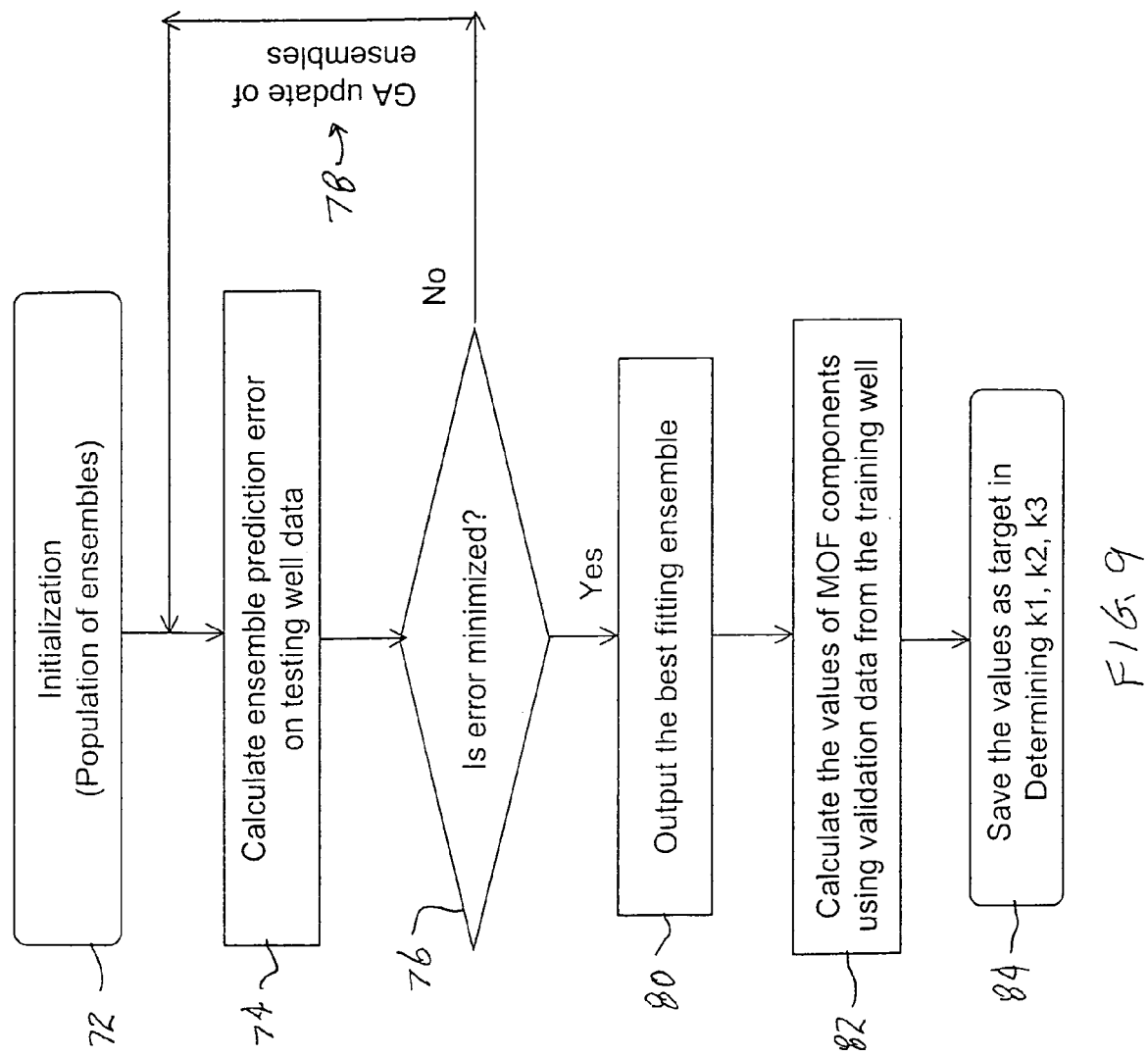
FIGS. 9 and 10 are flow charts illustrating a process for using genetic algorithms to select weighting constants for use in the algorithm described with reference to FIGS. 3 and 4.
Figure 10:
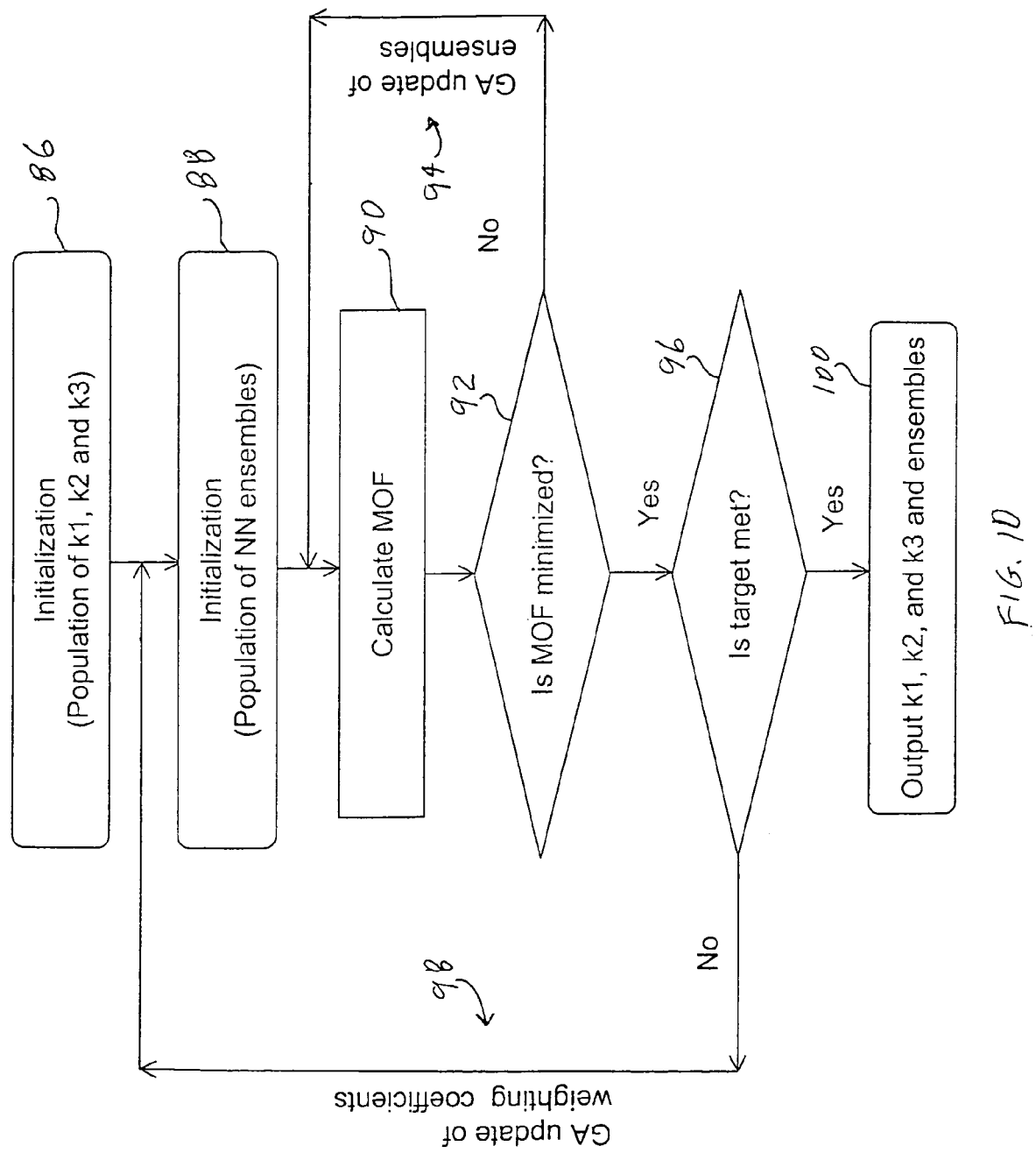

In the above described methods, the weighting functions, $k_1$, $k_2$, and $k_3$ may be selected based on various factors. FIGS. 9 and 10 illustrate a process by which the weighting functions may be estimated using a separate genetic algorithm driven inverse process if additional data from a test well is available. This process may be used to determine what weighting factors applied to the primary validation data from the training well or wells would lead to the finding of a set of ensembles that could minimize the prediction error on other application wells similar to the test well.

The process of FIG. 9 is in many ways the same as the genetic algorithm process described above with respect to FIGS. 1-4. At step 72 an initial population of ensembles of the trained neural networks is provided, like step 28 of FIG. 2. At step 74 a prediction error based on testing well data is calculated using only the EMSE objective, i.e. $k_1$=1. At 76 the error is evaluated and if not minimized, at 78 a genetic algorithm is used to adjust the population of ensembles until a best fitting ensemble is found at step 80. At step 82 the values of the three multi-objective functions EMSE, $\overline{SSW}$ and $\overline{P}$ for the best fitting ensemble are calculated based on the validation data from the training well. At step 84, the multi-objective function values calculated at step 82 are stored as target values for calculating $k_1$, $k_2$, and $k_3$.

In FIG. 10 an initial population of weighting factors $k_1$, $k_2$, and $k_3$ are provided at block 86. An initial population of neural network ensembles is provided at block 88. At block 90, the multi-objective function, equation (1), is calculated. If at block 92, the multi-objective function is not minimized, then the genetic algorithm 94, which may the same as described with reference to FIGS. 1-4, is used to modify the population of ensembles and the steps repeated to achieve a minimized multi-objective function at block 92.

When a minimized multi-objective function is achieved at block 92, it is compared to the target, which was saved from the FIG. 9 process, at step 96. If the target is not met at block 96, an outer loop genetic algorithm 98 is used to adjust the population of weighting factors and the process including the inner genetic algorithm 94 is repeated. When the target is met at block 96, the set of weighting factors $k_1$, $k_2$, and $k_3$ is output at step 100 for use in selecting a neural network ensemble by the processes of FIGS. 1-4. These weighting coefficients or factors should be optimum for selecting ensembles for other application wells which are similar to the test well.

FIG. 11 lists the testing errors achieved with six sets of ten best ensembles resulting from the various sets of weighting factors listed in the top row of the chart. The first three columns show results from actually using only one of the three functions included in the multi-objective function of equation (1). In the fourth column, the functions are equally balanced. The fifth column is the same as the last column of FIG. 7. The sixth column has weighting factors which were selected by the method shown in FIGS. 9 and 10.

The present invention has a number of advantages. It is an autonomous approach that will benefit not only neural network computing experts, but will also benefit non-experts. It allows the use of conventional training algorithms to generate diverse individual neural networks. It is flexible in allowing selection of weighting functions for the multi-objective function and selection of validation sets with other data mining techniques. Although the number of networks in an ensemble is preselected, the ensembles are automatically updated by the genetic algorithm process. The process often results in a particular neural network appearing more than once in a given ensemble. This is equivalent to adding weighting factors to the particular member networks. The final result of the genetic algorithm is a ranked list of ensembles. This allows the user to test multiple ensembles with new data as it becomes available and possibly select different ensembles for different parts of a field or area.

It is apparent that various changes can be made in the apparatus and methods disclosed herein, without departing from the scope of the invention as defined by the appended claims.

The invention claimed is:

1. Apparatus for producing as outputs synthetic values of at least one geophysical parameter for a well in response to inputs of actual values of geophysical parameters measured in the well, comprising a neural network ensemble selected by:
   training a set of individual neural networks to produce one or more synthetic output values of at least one geophysical parameter for a well in response to a plurality of inputs of actual values of geophysical parameters measured in the well, and
   using a genetic algorithm having a multi-objective fitness function to select at least one ensemble, comprising a subset of the set of individual neural networks, having a desirable fitness function value.

2. Apparatus according to claim 1, wherein the fitness function comprises a negative error correlation objective.

3. Apparatus according to claim 1, wherein each ensemble comprises five individual neural networks.

4. Apparatus according to claim 1, wherein the neural network ensemble is further selected by using the genetic algorithm to select a group of ensembles having desirable fitness function values.

5. Apparatus according to claim 4, wherein the neural network ensemble is further selected by testing one or more of the ensembles from the group of ensembles with data comprising actual input values and output values.

6. Apparatus according to claim 1, wherein each member of the set of neural networks has diverse initial parameters.

7. Apparatus according to claim 6 wherein each member of the set of neural networks has a different number of hidden nodes.

8. Apparatus according to claim 7, wherein the set of neural networks comprises thirty-two neural networks.

9. Apparatus according to claim 8, wherein the neural networks have from five to thirty-six hidden nodes.

10. Apparatus according to claim 1, wherein the multi-objective function includes an ensemble mean squared error objective.

11. Apparatus according to claim 1, wherein the multi-objective function includes a sum squared weights objective.

12. Apparatus according to claim 1, wherein the individual neural networks are trained to produce as outputs predicted open hole logging parameters in response to inputs comprising pulsed neutron logging parameters.

13. Apparatus according to claim 1, wherein the neural network ensemble is further selected by selecting a weighting factor for each objective of the multi-objective function.

14. Apparatus according to claim 13, wherein the neural network ensemble is further selected by using a genetic algorithm to select the weighting factors.

15. A method for producing synthetic open hole logs from actual pulsed neutron logs, comprising:

receiving log data from a pulsed neutron logging tool; and generating synthetic open hole logs from the received log data using a neural network ensemble selected from a set of individual networks by a genetic algorithm having a multi-objective fitness function.

16. A method according to claim 15 wherein the multi-objective function comprises a negative error correlation objective.

17. A method for generating a neural network ensemble for processing pulsed neutron well log data, comprising:

training a set of individual neural networks to produce one or more output values in response to pulsed neutron well log input data, and using a genetic algorithm having a multi-objective fitness function to select at least one ensemble, comprising a subset of the set of individual neural networks, having a desirable fitness function value.

18. A method according to claim 17, wherein the fitness function comprises a negative error correlation objective.

* * * * *

UNITED STATES PATENT AND TRADEMARK OFFICE
CERTIFICATE OF CORRECTION

PATENT NO. : 7,280,987 B2 Page 1 of 1
APPLICATION NO. : 10/811403
DATED : October 9, 2007
INVENTOR(S) : Dingding Chen, Syed Hamid and Harry D. Smith, Jr.

It is certified that error appears in the above-identified patent and that said Letters Patent is hereby corrected as shown below:

In col. 6, line 22, equation (3) and col. 6, line 35, equation (4), please amend the summation index "$j \neq 1$" to read -- $j \neq i$ --.

Signed and Sealed this

Twenty-fifth Day of December, 2007

JON W. DUDAS
*Director of the United States Patent and Trademark Office*